US012264044B1

(12) United States Patent
Cheng et al.

(10) Patent No.: US 12,264,044 B1
(45) Date of Patent: Apr. 1, 2025

(54) STAIR LIFTING CHAIR

(71) Applicant: MERITS HEALTH PRODUCTS CO., LTD., Taichung (TW)

(72) Inventors: Ming-Chuan Cheng, Taichung (TW); Shun-Yuan Cheng, Taichung (TW)

(73) Assignee: MERITS HEALTH PRODUCTS CO., LTD., Taichung (TW)

( * ) Notice: Subject to any disclaimer, the term of this patent is extended or adjusted under 35 U.S.C. 154(b) by 0 days.

(21) Appl. No.: 18/658,671

(22) Filed: May 8, 2024

(30) Foreign Application Priority Data

Jan. 3, 2024 (TW) ................................ 113200098

(51) Int. Cl.
*B66B 9/08* (2006.01)

(52) U.S. Cl.
CPC .................................. *B66B 9/0846* (2013.01)

(58) Field of Classification Search
CPC .................................................... B66B 9/0846
See application file for complete search history.

(56) References Cited

U.S. PATENT DOCUMENTS 5,360,084 A * 11/1994 Graf ......................... B61K 3/02 184/15.3
6,082,496 A * 7/2000 Bovis .................... B66B 9/0815 187/200
6,332,512 B1 * 12/2001 Muranaka ............. B66B 9/0815 104/118
11,753,278 B2 * 9/2023 Brook ................... B66B 9/0846 187/201
2004/0104078 A1 * 6/2004 Szentistvany ......... B66B 9/0846 187/245
2021/0069052 A1 * 3/2021 Burke ................ A62B 35/0081

FOREIGN PATENT DOCUMENTS

| | | | | | |
|---|---|---|---|---|---|
| CN | 107906120 | B | * | 4/2024 | .............. F16C 29/04 |
| CN | 221195741 | U | * | 6/2024 | |
| GB | 2484709 | A | * | 4/2012 | ............... B66B 9/08 |
| TW | M379676 | U | * | 5/2010 | |
| WO | WO-2022107051 | A1 | * | 5/2022 | ............... A61H 3/00 |

* cited by examiner

*Primary Examiner* — Michael A Riegelman
(74) *Attorney, Agent, or Firm* — CKC & Partners Co., LLC

(57) ABSTRACT

A stair lifting chair includes a chair, a first guiding assembly, and a second guiding assembly. The first guiding assembly includes a guiding frame and a first cleaning member. The first guiding frame includes a first inner space for the first rail passing therethrough. The first cleaning member is disposed at the first guiding frame to clean a first outer surface of the first rail. The second guiding assembly includes a second guiding frame and a second cleaning member. The second guiding frame includes a second inner space for the second rail passing therethrough. The second cleaning member is disposed at the second guiding frame to clean a second outer surface of the second rail.

10 Claims, 6 Drawing Sheets

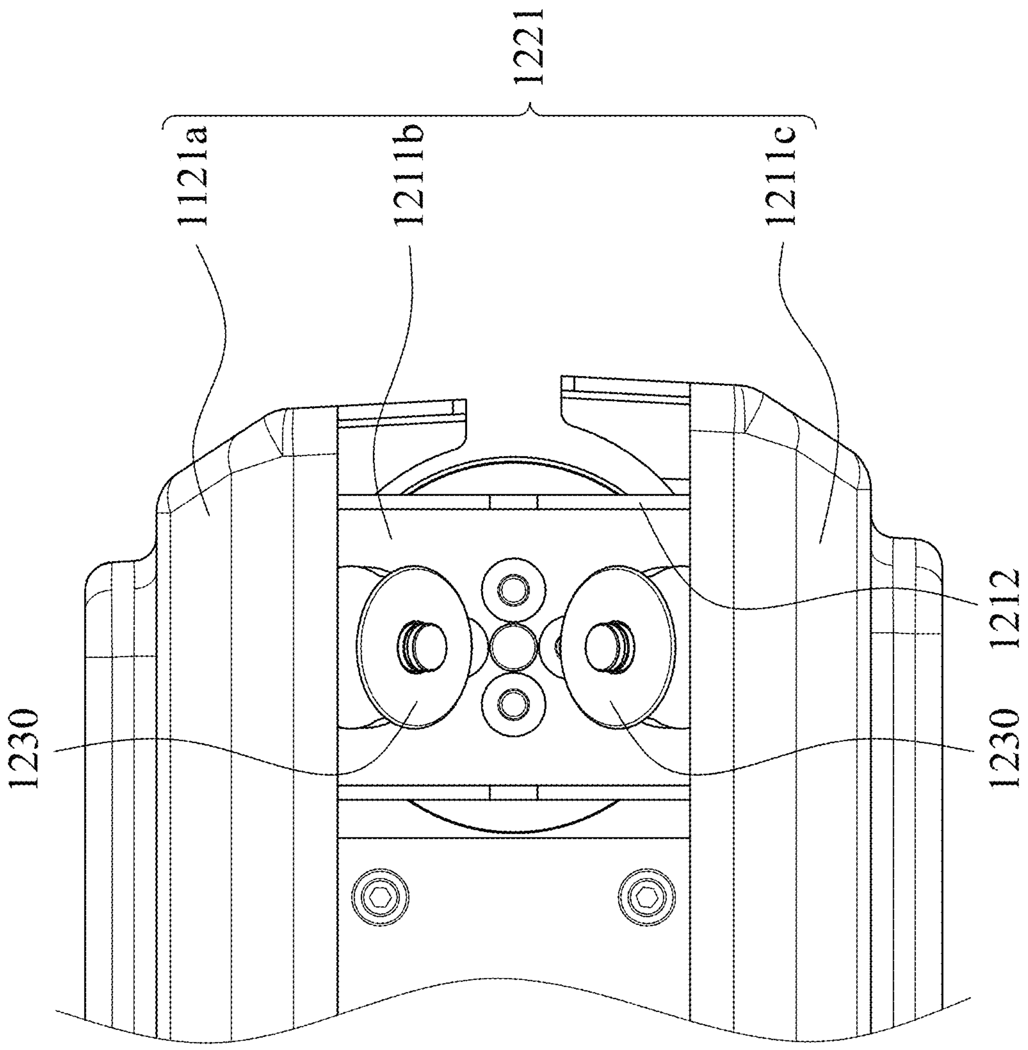
Fig. 4
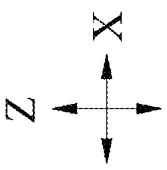

STAIR LIFTING CHAIR

RELATED APPLICATIONS

This application claims priority to Taiwan Application Serial Number 113200098, filed Jan. 3, 2024, which is herein incorporated by reference.

BACKGROUND

Technical Field

The present disclosure relates to a lifting chair. More particularly, the present disclosure relates to a stair lifting chair disposed at stairs.

Description of Related Art

Due to the improvement of the technique, lots assistive devices which can assist people with reduced mobility or elders are developed, and the stair lifting chair is one of them. The stair lifting chair can be disposed at at least one rail, the rail is disposed along the slope of the stair, and throughout controlling the mechanism of the stair lifting chair, the stair lifting chair can move along the rail. Therefore, the people with reduced mobility or the elders can achieve the purpose of going upstairs or downstairs by sitting on the stair lifting chair.

Because the stair lifting chair is connected to the rail through a guiding member, the motion of the guiding member is affected by dust and danger occurs when the dust or dirt accumulated on the rail. Hence, the stair lifting chair needs to be cleaned by users or maintenance personnel regularly, which is very inconvenient and might increase the cost of maintenance.

In view of this, how to improve the structure of the stair lifting chair to allow the stair lifting chair to have the function of cleaning the rails automatically becomes the goal that those in the field pursue.

SUMMARY

According to one aspect of the present disclosure, a stair lifting chair disposed at a first rail and a second rail is provided. The first rail and the second rail are arranged side by side, and the stair lifting chair includes a chair, a first guiding assembly, and a second guiding assembly. The first guiding assembly is disposed at the chair and is connected to the first rail, and the first guiding assembly includes a first guiding frame and a first cleaning member. The first guiding frame includes a first inner space for the first rail passing therethrough. The first cleaning member is disposed at the first guiding frame to clean a first outer surface of the first rail. The second guiding assembly is disposed at the chair and is spaced apart from the first guiding assembly, and the second guiding assembly is connected to the second rail and includes a second guiding frame and a second cleaning member. The second guiding frame includes a second inner space for the second rail passing therethrough. The second cleaning member is disposed at the second guiding frame to clean a second outer surface of the second rail.

According to another aspect of the present disclosure, a stair lifting chair disposed at a first rail and a second rail is provided. The first rail and the second rail are arranged side by side, and the stair lifting chair includes a chair, a first guiding assembly and a second guiding assembly. The first guiding assembly is disposed at the chair and is connected to the first rail, and the first guiding assembly includes a first guiding frame and two first cleaning members. The first guiding frame includes a first inner space for the first rail passing therethrough. The two first cleaning members are detachably connected to two sides of the first guiding frame, respectively, to clean a first outer surface of the first rail. The second guiding assembly is disposed at the chair and is spaced apart from the first guiding assembly, and the second guiding assembly is connected the second rail and includes a second guiding frame and two second cleaning members. The second guiding frame includes a second inner space for the second rail passing therethrough. The two second cleaning members are detachably connected to two sides of the second guiding frame, respectively, to clean a second outer surface of the second rail

BRIEF DESCRIPTION OF THE DRAWINGS

The present disclosure can be more fully understood by reading the following detailed description of the embodiment, with reference made to the accompanying drawings as follows:

FIG. 4 is a partial front view of a first guiding frame of the stair lifting chair according to the embodiment of FIG. 1.

DETAILED DESCRIPTION

Figure 1:
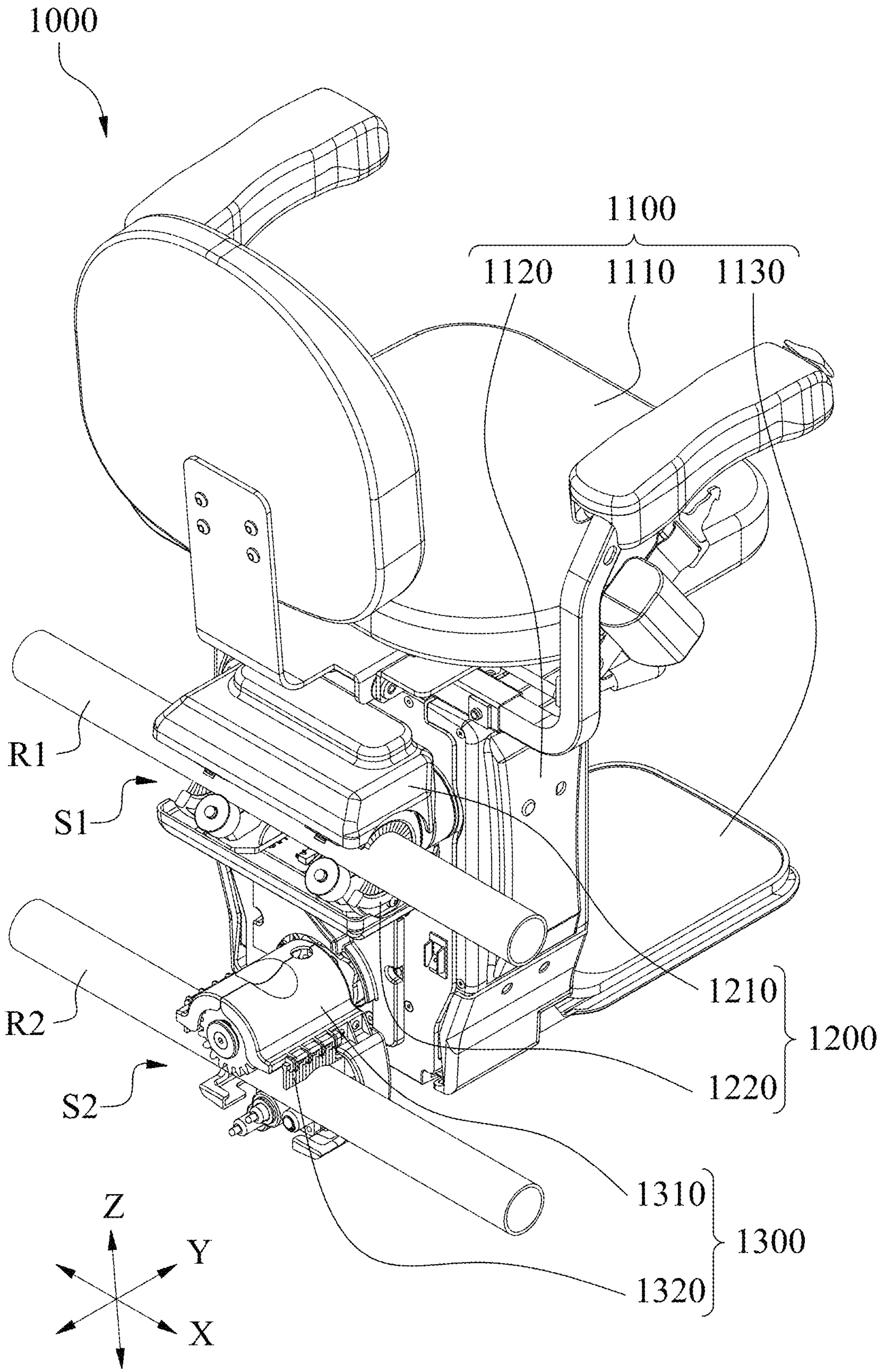
FIG. 1 is a three-dimensional schematic view of a stair lifting chair according to one embodiment of the present disclosure disposed at a first rail and a second rail.

The embodiments of the present disclosure will be illustrated with drawings hereinafter. In order to clearly describe the content, many practical details will be mentioned with the description hereinafter. However, it will be understood by the reader that the practical details will not limit the present disclosure. In other words, in some embodiment of the present disclosure, the practical details are not necessary. Additionally, in order to simplify the drawings, some conventional structures and elements will be illustrated in the drawings in a simple way; the repeated elements may be labeled by the same or similar reference numerals.

In addition, the terms first, second, third, etc. are used herein to describe various elements or components, these elements or components should not be limited by these terms. Consequently, a first element or component discussed below could be termed a second element or component. Moreover, the combinations of the elements, the components, the mechanisms and the modules are not well-known, ordinary or conventional combinations, and whether the combinations can be easily completed by the one skilled in the art cannot be judged based on whether the elements, the components, the mechanisms or the module themselves are well-known, ordinary or conventional.

Figure 2:
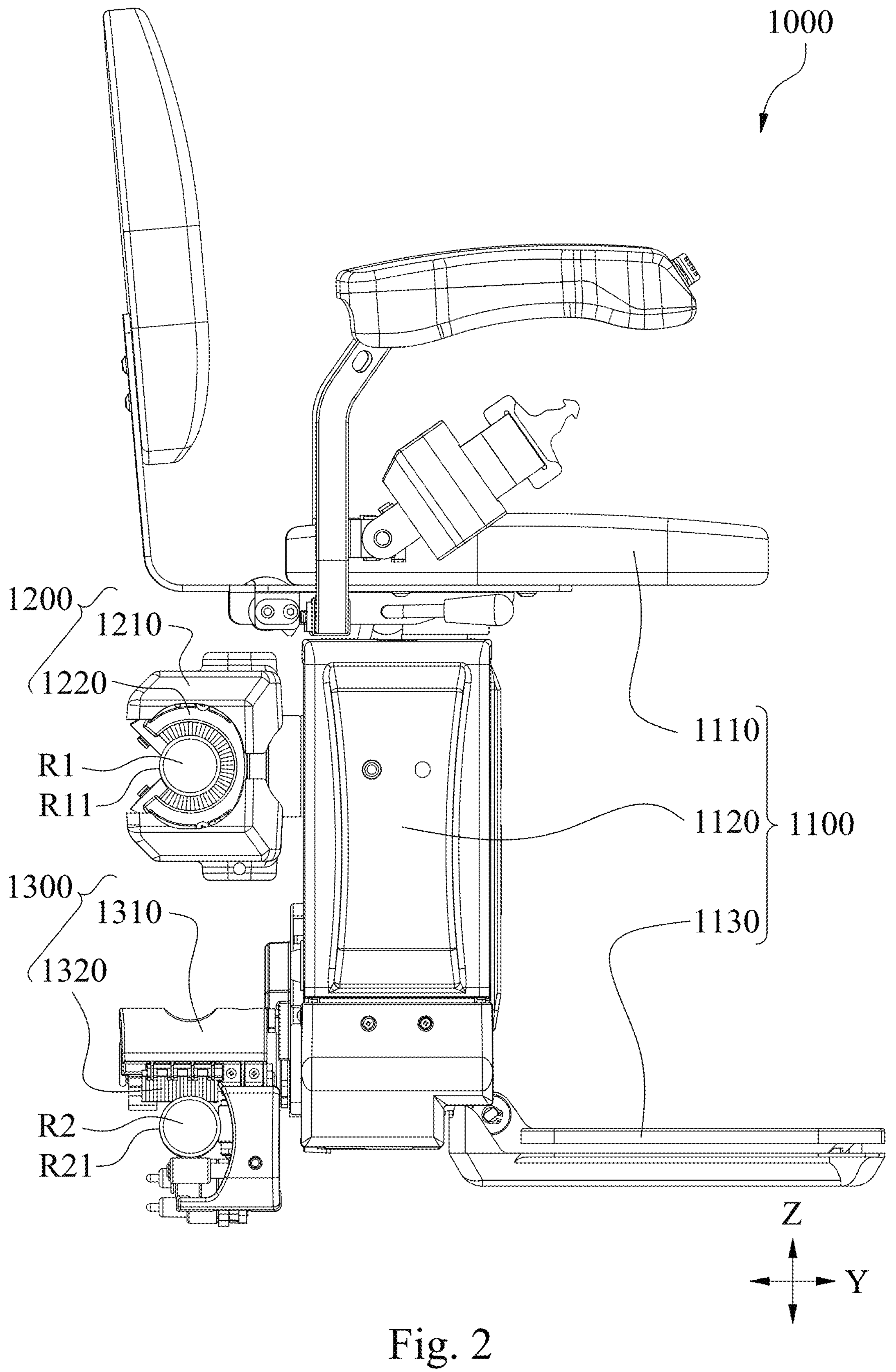
FIG. 2 is a side view of the stair lifting chair according to the embodiment of FIG. 1 disposed at the first rail and the second rail.

Please refer to FIG. 1 and FIG. 2, FIG. 1 is a three-dimensional schematic view of a stair lifting chair 1000 according to one embodiment of the present disclosure disposed at a first rail R1 and a second rail R2, and FIG. 2 is a side view of the stair lifting chair 1000 according to the embodiment in FIG. 1 disposed at the first rail R1 and the second rail R2. The stair lifting chair 1000 is disposed at the first rail R1 and the second rail R2, the first rail R1 and the second rail R2 are arranged side by side, and the stair lifting chair 1000 includes a chair 1100, a first guiding assembly 1200 and a second guiding assembly 1300.

The first guiding assembly 1200 is disposed at the chair 1100 and is connected to the first rail R1, and the first guiding assembly 1200 includes a first guiding frame 1210 and a first cleaning member 1220. The first guiding frame 1210 includes a first inner space S1 for the first rail R1 passing therethrough. The first cleaning member 1220 is disposed at the first guiding frame 1210 to clean a first outer space R11 of the first rail R1. The second guiding assembly 1300 is disposed at the chair 1100 and is spaced apart from the first guiding assembly 1200, and the second guiding assembly 1300 is connected to the second rail R2 and includes a second guiding frame 1310 and a second cleaning member 1320. The second guiding frame 1310 includes a second inner space S2 for the second rail R2 passing therethrough. The second cleaning member 1320 is disposed at the second guiding frame 1310 to clean a second outer space R21 of the second rail R2.

Therefore, when the first guiding assembly 1200 and the second guiding assembly 1300 move along the first rail R1 and the second rail R2, respectively, the first cleaning member 1220 and the second cleaning member 1320 can automatically clean the first outer surface R11 of the first rail R1 and the second outer surface R21 of the second rail R2, respectively, and a goal of automatical cleaning is achieved. The details of the stair lifting chair 1000 may be described hereinafter.

The first rail R1 and the second rail R2 are disposed beside the stairs, and are arranged and spaced apart from each other horizontally along a height direction (parallel with a Z axis). The first rail R1 and the second rail R2 can be bent with the curvature of the stairs, and guide the stair lifting chair 1000 up and down smoothly.

The chair 1100 can include a seat 1110, a supporting base 1120 and a foot rest 1130, the supporting base 1120 is connected between the seat 1110 and the foot rest 1130 along the height direction, and therefore a user can sit on the seat 1110 and put the feet on the foot rest 1130. The first guiding assembly 1200 and the second guiding assembly 1300 can be disposed at intervals at a back side of the supporting base 1120 along the height direction. In other embodiments, the first guiding assembly and the second guiding assembly can be disposed at any place according to the demands, but the present disclosure is not limited thereto.

Figure 3:
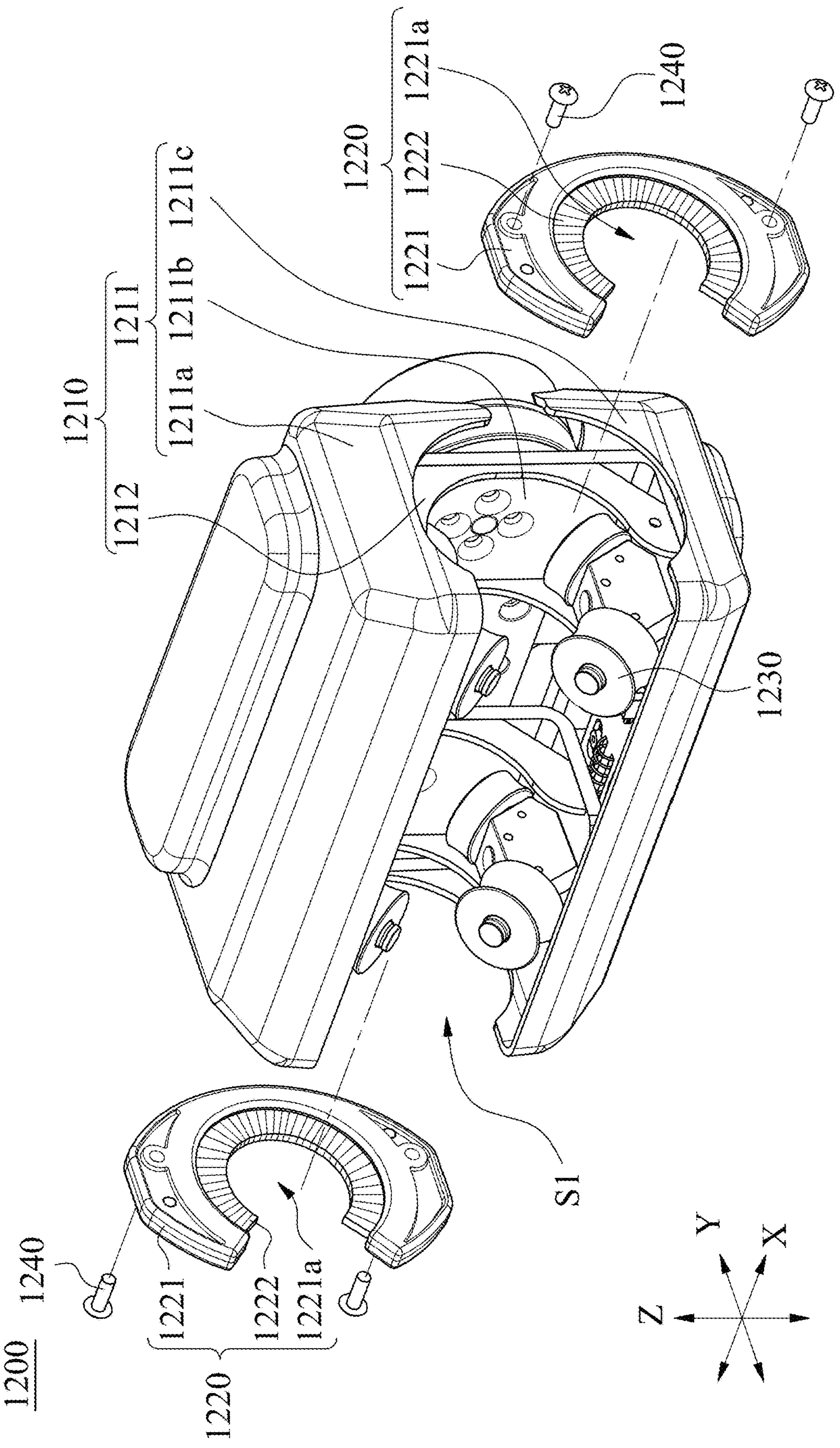
FIG. 3 is a partially exploded view of a first guiding assembly of the stair lifting chair according to the embodiment of FIG. 1.

Please refer to FIG. 3 and FIG. 4 with references of FIG. 1 and FIG. 2, FIG. 3 is a partially exploded view of the first guiding assembly 1200 of the stair lifting chair 1000 according to the embodiment of FIG. 1, and FIG. 4 is a partial front view of the first guiding frame 1210 of the stair lifting chair 1000 according to the embodiment of FIG. 1. For the convenience of replacing the first cleaning member 1220, the first cleaning member 1220 is detachably connected to the first guiding frame 1210. As shown in FIG. 1 to FIG. 4, the first cleaning member 1220 is fastened with the first guiding frame 1210, that is, being assembled in a lockable method.

To be more specific, the first guiding frame 1210 can include a first frame body 1211 and a first locking sheet 1212. The first frame body 1211 can be connected to the chair 1100 and includes an upper cover 1211*a*, a lower cover 1211*c* and a first backboard 1211*b*. The upper cover 1211*a*, the lower cover 1211*c* and the first backboard 1211*b* are fastened with each other and encircle the first inner space S1. The first locking sheet 1212 can be located in the first frame body 1211 and protrudes from the first backboard 1211*b* of the first frame body 1211. The first cleaning member 1220 can be located in the first frame body 1211 and can be fastened with the first locking sheet 1212.

The upper cover 1211*a* and the lower cover 12110 are in rectangular shape and each of the upper cover 1211*a* and the lower cover 1211*c* includes two upper side portions and two lower portions opposite to each other in a length direction (parallel with an X axis). The first locking sheet 1212 is close to a first one of the two upper side portions and a first one of the two lower side portions of a first one of the two sides of the first guiding frame 1210, and the first locking sheet 1212 is spaced apart from the first one of the two upper side portions and the first one of the two lower side portions of the first one of the two sides of the first guiding frame 1210 to form a groove. Therefore, when two screws 1240 fasten with the first cleaning member 1220 on the first guiding frame 1210, the first cleaning member 1220 can be located in the groove.

Furthermore, the first guiding assembly 1200 can include two first cleaning members 1220, and the two first cleaning members 1220 can be detachably connected to the two sides of the first guiding frame 1210, respectively. Therefore, a number of the first locking sheet 1212 can also be two, and the two first locking sheets 1212 are respectively configured for the two first cleaning members 1220 to fasten therewith. Two grooves may be respectively formed at the two sides in the first guiding frame 1210 for respectively placing the two first cleaning members 1220.

As shown in FIG. 2 and FIG. 3, the first locking sheet 1212 can have a C-shaped structure, and the first cleaning member 1220 can include a C-shaped body 1221 and a plurality of first filaments 1222. The C-shaped body 1221 corresponds to the first locking sheet 1212 and includes an opening 1221*a*, and the opening 1221*a* is configured for the first rail R1 to pass therethrough. The first filaments 1222 protrude into the opening 1221*a* from the C-shaped body 1221 so as to contact the first outer surface R11 of the first rail R1. Because the cross section of the first rail R1 is in circular shape and is placed inside the first inner space S1 of the first guiding frame 1210, the shape of the first locking sheet 1212 and the shape of the first cleaning member 1220 both match the first rail R1. Moreover, for the convenience of replacing the first cleaning member 1220, the smallest distance of two free ends of the C-shaped body 1221 is larger than a diameter of the first rail R1, and the first cleaning member 1220 can be detached or replaced after unscrewing the screws 1240. In other embodiments, the first cleaning member can also have a row filaments structure or a C-shaped cleaning strip structure, and can take away the dust by friction, but the present disclosure is not limited thereto.

The first guiding assembly 1200 can further include a plurality of the first guiding wheels 1230, and the first guiding wheels 1230 can be disposed in the first frame body 1211 and contact the first rail R1 wavily. The other structures of the first guiding assembly 1200 are conventional and not the key point of the present disclosure, and will not be repeated.

Figure 5:
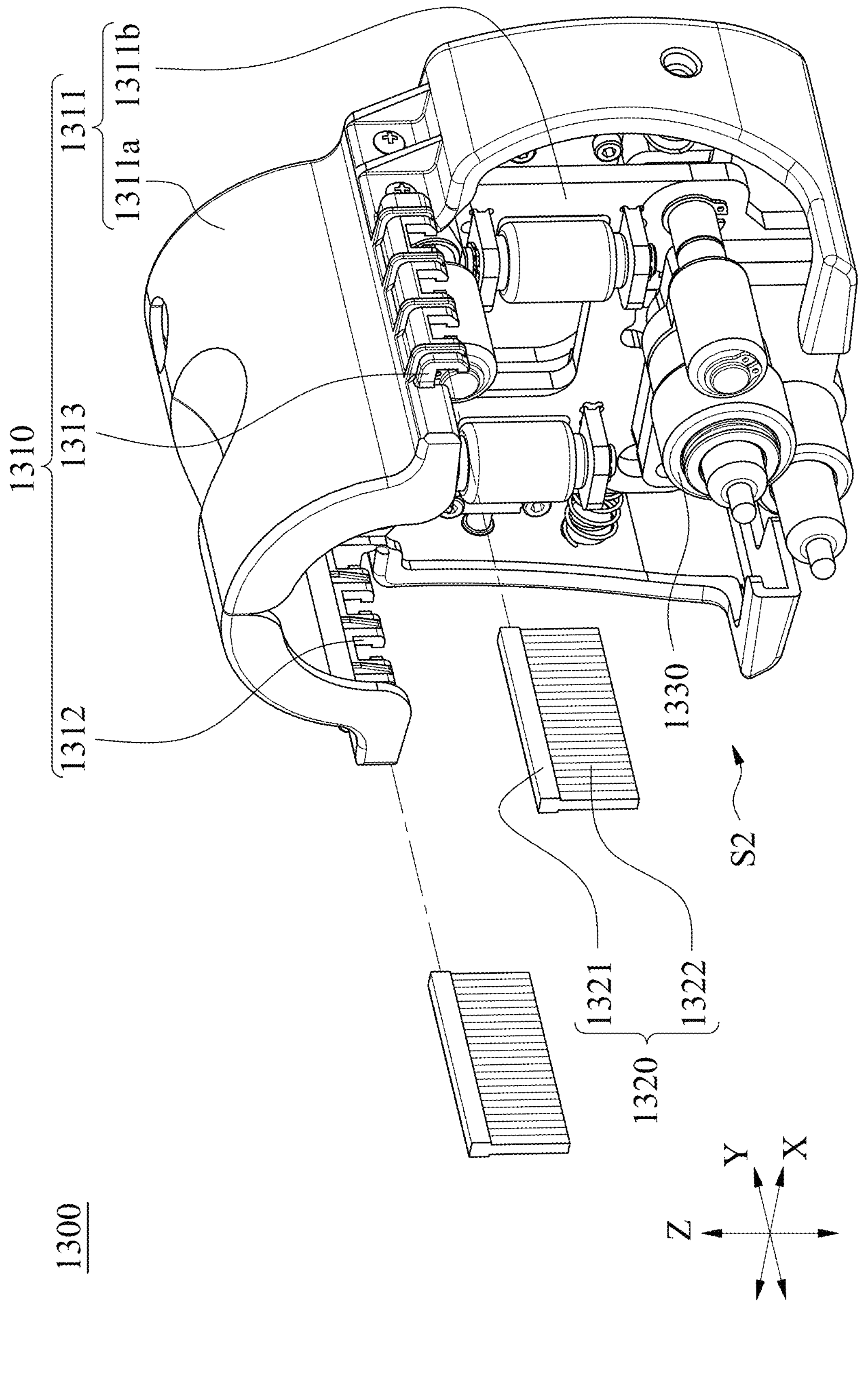
FIG. 5 is a partially exploded view of a second guiding assembly of the stair lifting chair according to the embodiment of FIG. 1.
Figure 6:
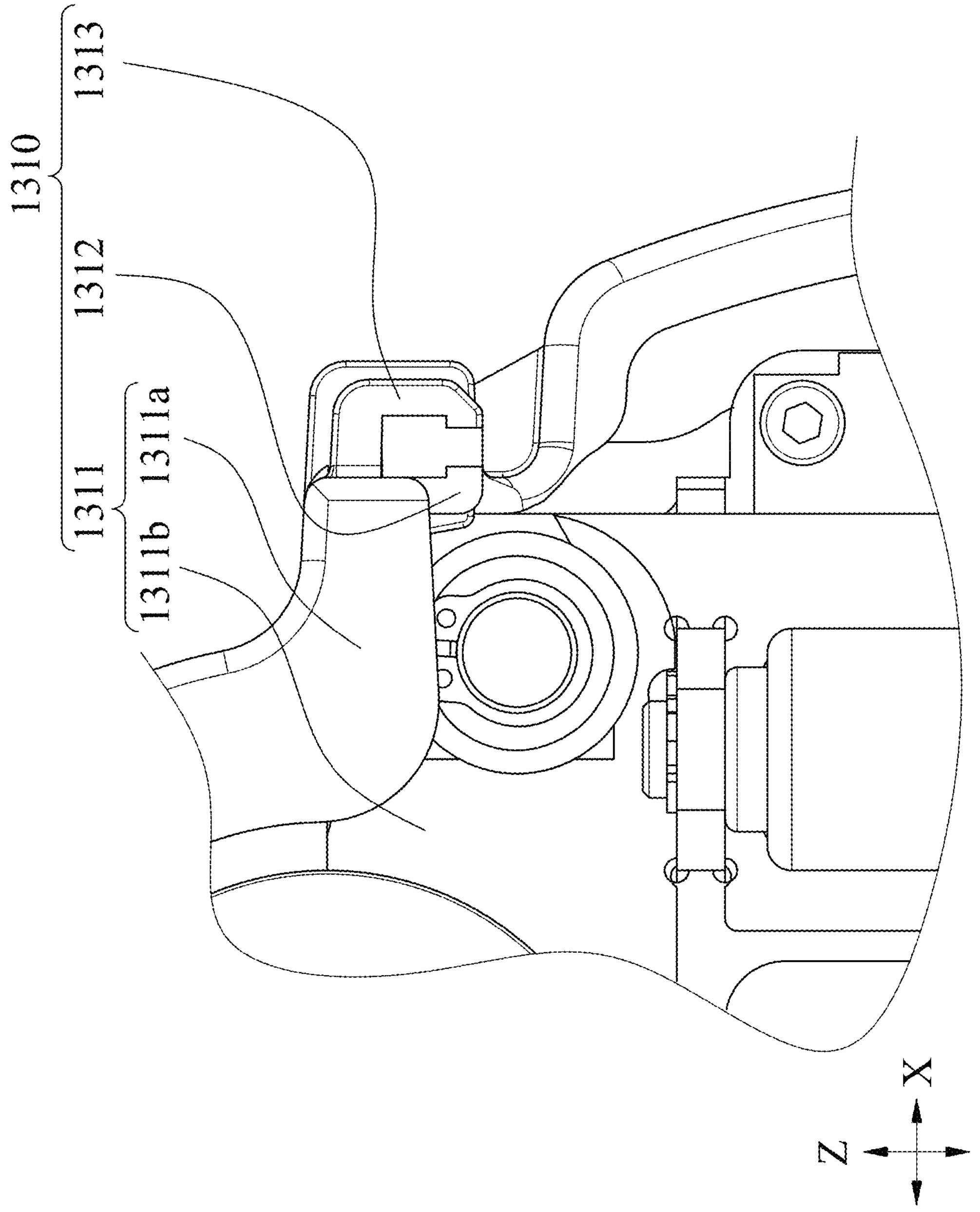
FIG. 6 is a partial front view of a second guiding frame of the stair lifting chair according to the embodiment of FIG. 1.

Please refer to FIG. 5 and FIG. 6 with references of FIG. 1 and FIG. 2, FIG. 5 is a partially exploded view of the second guiding assembly 1300 of the stair lifting chair 1000 according to the embodiment of FIG. 1, FIG. 6 is a partial front view of the second guiding frame 1310 of the stair lifting chair 1000 according to the embodiment of FIG. 1, and it is noted that a gear in FIG. 1 and FIG. 2 is omitted in FIG. 5 and FIG. 6. In order to increase the convenience of replacing the second cleaning member 1320, the second cleaning member 1320 is detachably connected to the second guiding frame 1310, and as shown in FIG. 1 to FIG. 2 and FIG. 5 to FIG. 6, the second cleaning member 1320 can be slidably inserted to the second guiding frame 1310.

To be more specific, the second guiding frame 1310 can include a second frame body 1311, a plurality of inner clamping arms 1312 and a plurality of outer clamping arms 1313. The second frame body 1311 is connected to the chair 1100 and includes a top cover 1311*a*. The inner clamping arms 1312 are connected to the top cover 1311*a* and are spaced apart from each other along a depth direction (parallel with a Y axis) of the second frame body 1311. The outer clamping arms 1313 are connected to the top cover 1311*a* and are spaced apart from each other along the depth direction of the second frame body 1311, and the outer clamping arms 1313 and the inner clamping arms 1312 form a slot. The second cleaning member 1320 is slidably inserted in the slot.

As shown in FIG. 6, a cross section of the top cover 1311*a* on a plane parallel with the X axis and the Z axis is in an arc shape and the top cover 1311*a* includes two side edges opposite to each other in the length direction. Each inner clamping arm 1312 protrudes below a first one of the two side edges and includes an inner stop portion at a distal end. Each outer clamping arm 1313 is substantially in L-shape, protrudes outward in the length direction from the first one of the two side edges for a distance, and extends downwardly along the height direction. Each outer clamping arm 1313 includes an outer stop portion at a distal end. The inner clamping arms 1312 face toward the outer clamping arms 1313 to form the slot, and the slot is configured for the second cleaning member 1320 inserting therein. The inner stop portion and the outer stop portion can prevent the second cleaning member 1320 from detaching.

Moreover, the second guiding assembly 1300 can include two second cleaning members 1320, and the two second cleaning members 1320 can be respectively detachably connected to the two sides of the second guiding frame 1310. Therefore, the second guiding assembly 1300 can form two slots respectively at the two side edges of the top cover 1311*a*, and the two slots are configured for the two second cleaning members 1320 inserting therein, respectively.

As shown in FIG. 5, the second cleaning member 1320 can include a rib 1321 and a plurality of the second filaments 1322. The rib 1321 can be configured for inserting in the slot, and the second filaments 1322 extending downwardly from the rib 1321 contact the second outer surface R21 of the second rail R2 along the height direction. Therefore, when the second guiding assembly 1300 moves along the second rail R2, the second filaments 1322 can clean the dust. In other embodiments, the second cleaning member can also have a C-shaped filaments structure or a C-shaped cleaning strip structure, and can also be disposed at the second guiding frame by fastening, but the present disclosure is not limited thereto.

The second guiding assembly 1300 can further include the gear and a plurality of second guiding wheels 1330. The second frame body 1311 can further include a second backboard 1311*b* and two side covers, the second backboard 1311*b* and the two side covers are connected to the top cover 1311*a* and encircle the second inner space S2, and the gear and the second guiding wheels 1330 are pivotably disposed at the second backboard 1311*b*. The gear can be meshed on a gear rack (not shown), and therefore when the gear of the stair lifting chair 1000 rotates, the stair lifting chair 1000 can be moved up or down through the meshing of the gear and the gear rack.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A stair lifting chair disposed at a first rail and a second rail, the first rail and the second rail arranged side by side, the stair lifting chair comprising:
- a chair;
- a first guiding assembly disposed at the chair and connected to the first rail, the first guiding assembly comprising:
  - a first guiding frame comprising a first inner space for the first rail passing therethrough; and
  - a first cleaning member disposed at the first guiding frame to clean a first outer surface of the first rail; and
- a second guiding assembly disposed at the chair and spaced apart from the first guiding assembly, the second guiding assembly connected to the second rail, the second guiding assembly comprising:
  - a second guiding frame comprising a second inner space for the second rail passing therethrough; and
  - a second cleaning member disposed at the second guiding frame to clean a second outer surface of the second rail.

2. The stair lifting chair of claim 1, wherein the first cleaning member is fastened with the first guiding frame.

3. The stair lifting chair of claim 2, wherein the first guiding frame comprises:
- a first frame body connected to the chair and comprising an upper cover, a lower cover and a first backboard, wherein the upper cover, the lower cover and the first backboard are fastened with and connected to each other; and
- a first locking sheet located in the first frame body and protruding from the first backboard of the first frame body;
- wherein the first cleaning member is located in the first frame body and fastened with the first locking sheet.

4. The stair lifting chair of claim 3, wherein the first locking sheet has a C-shaped structure and the first cleaning member comprises:
- a C-shaped body corresponding to the first locking sheet and comprising an opening, wherein the opening is configured for the first rail to pass therethrough; and
- a plurality of first filaments protruding into the opening from the C-shaped body so as to contact the first outer surface of the first rail.

5. The stair lifting chair of claim 1, wherein the second cleaning member is inserted into the second guiding frame.

6. The stair lifting chair of claim 5, wherein the second guiding frame comprises:

a second frame body connected to the chair and comprising a top cover;

a plurality of inner clamping arms connected to the top cover and spaced apart from each other along a depth direction of the second frame body; and a plurality of outer clamping arms connected to the top cover and spaced apart from each other along the depth direction of the second frame body, wherein the outer clamping arms and the inner clamping arms form a slot;

wherein the second cleaning member is slidably inserted in the slot.

7. The stair lifting chair of claim 6, wherein the second cleaning member comprises a rib and a plurality of second filaments, the rib is configured for slidably inserting in the slot, and the second filaments extend along a height direction from the rib so as to contact the second outer surface of the second rail.

8. A stair lifting chair disposed at a first rail and a second rail, the first rail and the second rail arranged side by side, the stair lifting chair comprising:

a chair;

a first guiding assembly disposed at the chair and connected to the first rail, the first guiding assembly comprising:

a first guiding frame comprising a first inner space for the first rail passing therethrough; and two first cleaning members detachably connected to two sides of the first guiding frame, respectively, to clean a first outer surface of the first rail; and a second guiding assembly disposed at the chair and spaced apart from the first guiding assembly, the second guiding assembly connected to the second rail and comprising:

a second guiding frame comprising a second inner space for the second rail passing therethrough; and two second cleaning members detachably connected to two sides of the second guiding frame, respectively, to clean a second outer surface of the second rail.

9. The stair lifting chair of claim 8, wherein the two first cleaning members are fastened with the first guiding frame.

10. The stair lifting chair of claim 8, wherein the two second cleaning members are inserted into the second guiding frame.

* * * * *